(12) United States Patent
Makise et al.

(10) Patent No.: US 6,181,495 B1
(45) Date of Patent: Jan. 30, 2001

(54) DATA RECORDING APPARATUS

(75) Inventors: Tetsuro Makise; Teruyuki Yoshida, both of Kanagawa (JP)

(73) Assignee: Sony Corporation, Tokyo (JP)

(*) Notice: Under 35 U.S.C. 154(b), the term of this patent shall be extended for 0 days.

(21) Appl. No.: 09/270,605

(22) Filed: Mar. 17, 1999

(30) Foreign Application Priority Data

Mar. 18, 1998 (JP) .................................................. 10-068837

(51) Int. Cl.$^7$ ................................. G11B 5/09; G11B 5/02
(52) U.S. Cl. ................................. 360/46; 360/51; 360/68
(58) Field of Search ................................. 360/46, 51, 68, 360/65

(56) References Cited

U.S. PATENT DOCUMENTS

| | | |
|---|---|---|
| 4,920,461 | 4/1990 | Eiberger . |
| 5,323,277 | 6/1994 | Sugibayashi . |

OTHER PUBLICATIONS

Patent Abstracts of Japan, vol. 096, No. 002, Feb. 29, 1996 & JP 07 287804A (Sony Corp.), Oct. 31, 1995.
Patent Abstracts of Japan, vol. 016, No. 080 (P–1318), Feb. 26, 1992 & JP 03 268206A (Matsushita Electric Ind. Co. Ltd.), Nov. 28, 1991.
Patent Abstracts of Japan, vol. 016, No. 266 (P–1371), Jun. 16, 1992 & JP 04 067359 (Sony Corp.), Mar. 3, 1992.
J.A. Chaloupka, L.S. Frauenfelder: "Magnetic head writer driver", IBM Technical Disclosure Bulletin, vol.13, No. 8, Jan. 1971, p. 2239, XP002107849.
Patent Abstracts of Japan, vol. 014, No. 267 (P–1058), Jun. 8, 1990 & JP 02 073567A (Sony Corp.), Mar. 13, 1990.
Jan W.M. Bergmans: "Digital baseband transmission and recording; 2.3 Digital magnetic recording", 1996, Kluwer Academic, Dordrecht, The Netherlands, XP002107976, p. 55—p. 66.

*Primary Examiner*—W. Chris Kim
(74) *Attorney, Agent, or Firm*—Frommer Lawrence & Haug, LLP.; William S. Frommer

(57) ABSTRACT

In a data recording apparatus, the period of the first clock signal corresponding to the record data is multiplied by the stated numeric corresponding to the transfer rate with the clock signal forming structure, so that the second clock signal is formed. And, on the basis of the record data and the second clock signal, the recording current corresponding to the transfer rate that is formed by highlighting the high-frequency component in accordance with the transfer rate and by limiting the band in accordance with the transfer rate is generated with the recording current generating structure. Then, the recording data is recorded on the recording medium with the recording structure on the basis of the recording current, therefore, even if the transfer rate varies, it is able to equalize highlighting operation of high-frequency component of the recording current and to equalize band limitation so as to keep the frequency characteristics approximately constant. In this way, it is able to form nearly identical magnetization pattern on a recording medium even in the case where the transfer rate varies.

7 Claims, 9 Drawing Sheets

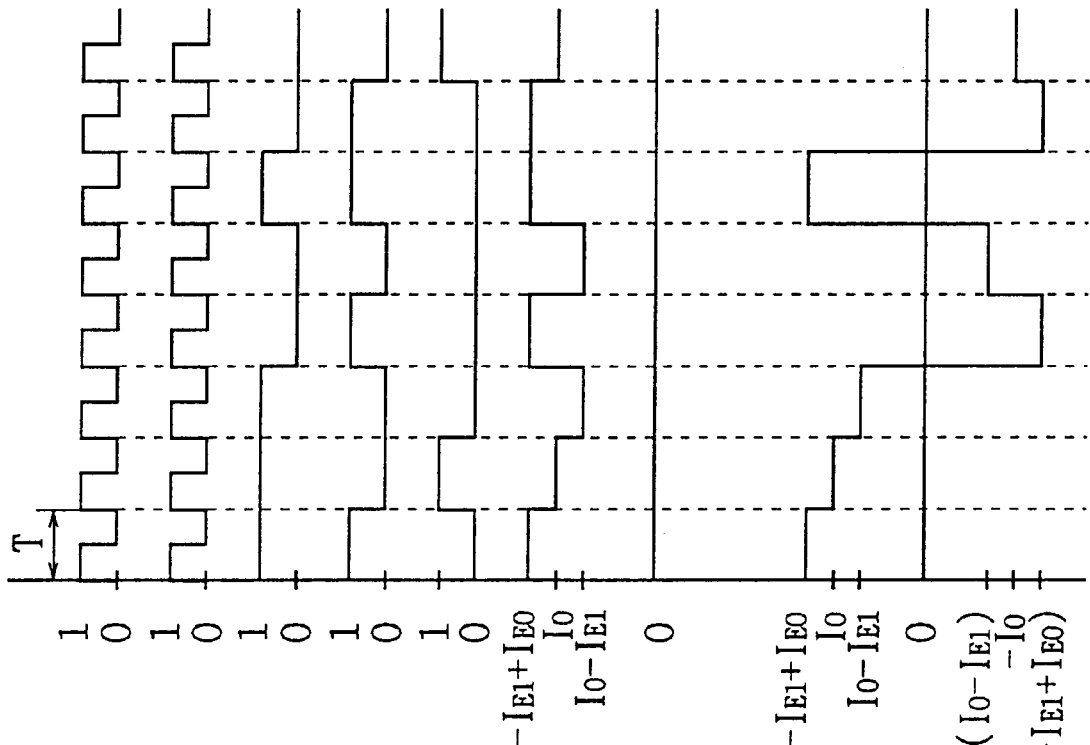

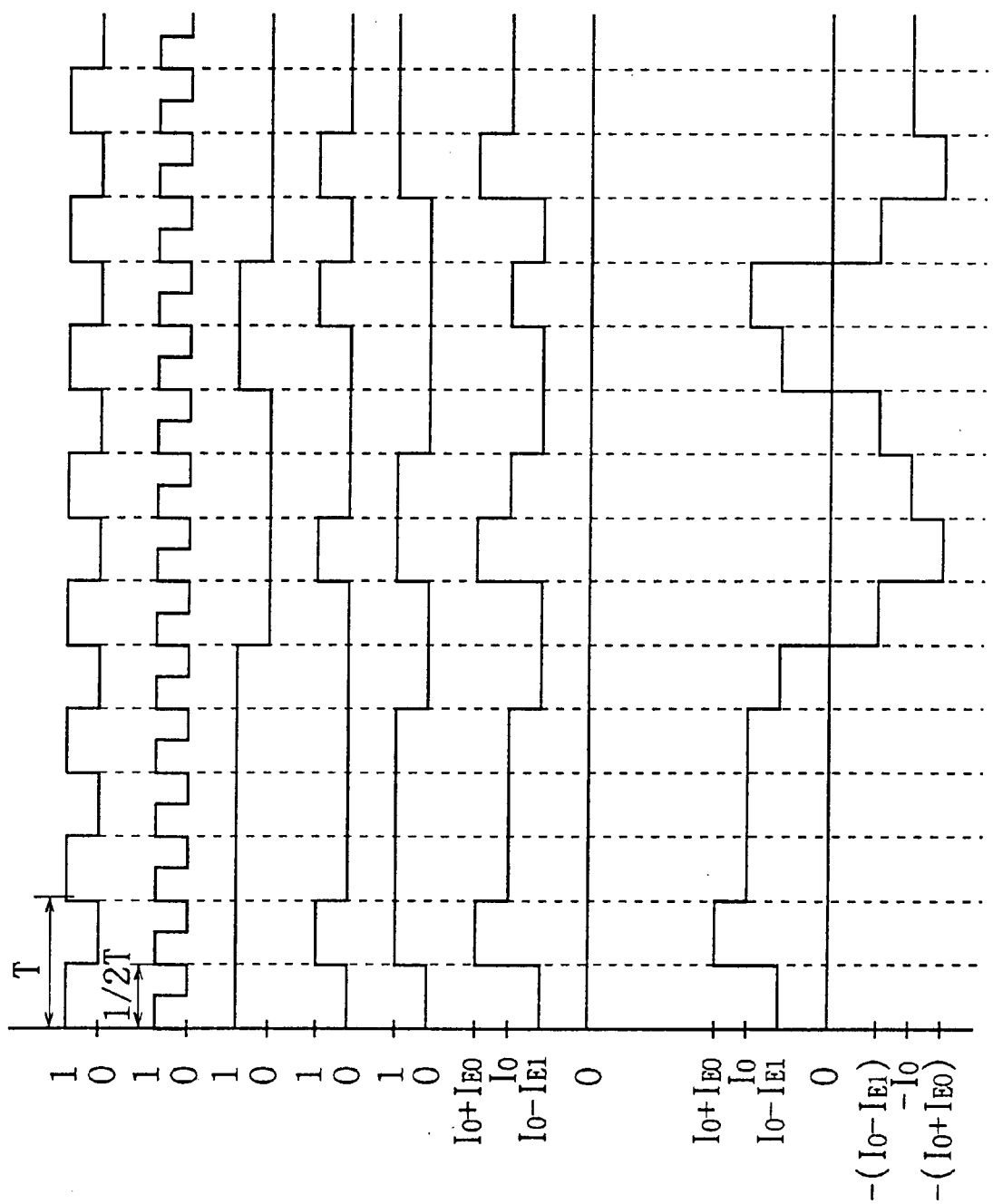

DATA RECORDING APPARATUS

BACKGROUND OF THE INVENTION

1. Field of the Invention

This invention relates to a data recording apparatus, and more particularly, is suitably applicable to a data recorder for recording digital record data on a magnetic tape with a helical scanning system using a rotational drum.

2. Description of the Related Art

As a data recorder, there is that which the ID-1 format, which has been standardized by America National Standards Institute (ANSI), is applied to.

In this ID-1 format, only recording format for record data and footprint, such as track length, track width and track angle of a magnetic tape and recording wavelength, has been prescribed, but rotational rate of a rotational drum (speed of a recording head), running speed of a magnetic tape, the number of recording heads, and others are not especially prescribed.

Therefore, in this kind of data recorder, it is able to perform variable-speed controlling of multiplying relative speed of the recording head relative to the recording track direction of the magnetic tape by 1/1, 1/2, 1/4, 1/8, 1/16, 1/24, etc., so that it is able to record/reproduce the record data with a desired transfer rate between about 100 Mbps/channel to about 4.2 Mbps/channel, for instance.

Therefore, this kind of data recorder is broadly utilized for such uses that observation data is recorded and reproduced, keeping the pace with the transfer rate of analyzing apparatuses; as an example, observation data that is obtained from an artificial satellite and that is having relatively fast transfer rate is recorded in real time and, on the other hand, the recorded observation data is reproduced at a slower transfer rate than that of recording, and, as an another example, observation data that is obtained from astronomic observation, monitoring of road status (occurrence of a traffic accident, a traffic backup and others), etc., and that is having relatively slow transfer rate is recorded at the original transfer rate and, on the other hand, the recorded observation data is reproduced at a faster transfer rate than that of recording.

By the way, in this kind of data recorder, it is able to cause the rotational head to rotate at a relatively high speed and to secure a relative velocity between the recording head and the magnetic tape, so as to utilize the recording capability of short wavelength of the magnetic tape to its maximum, so that high density recording and high transfer rate can be realized, and, in this way, it is able to enhance the recording rate for 1 channel to about 100 Mbps as stated above.

However, in the case where the record data has been recorded at about 100 Mbps in this manner, the permeability of the recording head (if the frequency becomes high because of high transfer rate, the permeability lowers) and the frequency characteristics of the recording amplifier and others equipped within the data recorder would reach to their limits.

In this kind of data recorder, it is able to lower the recording rate to, for instance, 4.2 Mbps or so by rotating the rotational head at a relatively low speed, and the permeability of the recording head and the frequency characteristics of the recording amplifier and others of this case become ideal status, within the region having sufficient margin.

In this kind of data recorder, there was such a problem that if the transfer rate is relatively high, under the influences of the permeability of the recording head and the frequency characteristics of the recording amplifier and others, the edge portion of the waveform pattern of the recording current corresponding to the record data dulls, that is, a lowering phenomenon of the high-frequency component occurs, and rising of the amplitude occurs in the vicinity of the maximum frequency of the recording current due to the resonance in the circuit of the output side of recording amplifier including the recording head, so that the frequency characteristic of this recording current changes. As a result of this, if the transfer rate differs, then the quantities of delaying of the phase of short wavelength relative to the phase of long wavelength in the magnetization pattern that has been recorded on the magnetic tape on the basis of the recording current. That is, if the quantity of so-called peak shift differ and the transfer rate differs, the magnetization patterns do not coincide.

By the way, as a data recorder that solves such a problem, heretofore, there is that which is constituted using a linear first recording amplifier (which has been disclosed by this applicant in Japanese Patent Laid Open No.07800/92) for equalizing high-frequency-component highlighting operations that is comprised of plural filters to which frequency characteristics have been set, according to transfer rate, and a linear second recording amplifier (which has been disclosed by this applicant in Japanese Patent Laid Open No.067359/92) for equalizing band limitations that is comprised of plural filters to which frequency characteristics have been set, according to transfer rate.

In this case, this data recorder passes a record signal through a filter of the first recording amplifier corresponding to its transfer rate and hereby previously highlight the high-frequency component of the edge portion so as to equalize the high-frequency-component highlighting operation in the case where the transfer rate differs, and also passes the record signal through a filter of the second recording amplifier corresponding to its transfer rate and hereby restrain the amplitude of the high-frequency component from rising in the band of the vicinity of the maximum frequency so as to limit it and equalize limitation of the band in the case where the transfer rate differs.

However, since such a data recorder employs class A amplifiers whose efficiencies are about 50% as the first and the second recording amplifiers, the consumed power becomes relatively large, and radiation plates for radiating heat generated in the class A amplifiers are needed, and so the configuration of the whole data recorder is complicated and enlarged—that has been the problem.

So, as a data recorder for solving the problem that arises from employing such linear first and second recording amplifiers and for varying frequency characteristics of the recording current in accordance with the transfer rate, there is that which is constituted as shown in FIG. 1 (which has been disclosed by this applicant in Japanese Patent Laid open No.287804/95).

That is, in this data recorder 1 shown in FIG. 1, digital data D1 that is supplied from the exterior at the stated transfer rate and input clock signal CK1 corresponding to the digital data D1 are inputted to a signal processing circuit 2.

This signal processing circuit 2 exposes the record data D1 to the stated recording signal processing to produce record data D2 shown in FIG. 2A and then sends this data to an edge extracting circuit 4 of a recording amplifier 3 that is comprised of a switching amplifier, and besides converts the input clock signal CK1 into the first clock signal CK2 having the stated period T shown in FIG. 2B and then sends this to the edge extracting circuit 4.

The edge extracting circuit 4, which operates on the basis of this first clock signal CK2, detects the time at which the record data D2 rises to the logical level [1] and also the time at which it falls to the logical level [0], and then, on the basis of this detection result, generates a timing signal ES that is showing the position to highlight its high-frequency component previously, in expectation of lowering of the high-frequency component of the edge portion. Then, the edge extracting circuit 4 sends the record data D2 to the first switching unit 5, and sends the timing signal ES to the second switching unit 6.

In this connection, the timing signal ES is synchronized with the first clock signal CK2, and raises to the logical level [1] during only the period T of the first clock signal CK2 from the time at which the record data D2 rises to the logical level [1] and also the time at which it falls to the logical level [0], respectively, as shown in FIG. 2C, so that the high-frequency component highlighting positions are shown by the logical level [1].

The first contact $a_1$ of the first switching unit 5 is connected to one of two coils, which are coupled with an intermediate tap 7A, that have been equipped on the primary side of a transducer 7, and the second contact $b_1$ is connected to the other coil; while the record data D2 lowers to the logical level [0], the transfer switch that has been mounted on the output terminal $c_1$ is connected to the first contact $a_1$, and, while the record data D2 raises to the logical level [1], the transfer switch is connected to the second contact $b_1$; in this manner, connection of the transfer switch is sequentially turned, on the basis of the record data D2.

As to the second switching unit 6, the first contact $a_2$ is connected to the ground, and the second contact $b_2$ is connected to the transfer switch of the first switching unit 5; while the timing signal ES lowers to the logical level [0], the transfer switch that has been mounted on the output terminal $c_2$ is connected to the first contact $a_2$, and, while the timing signal ES raises to the logical level [1], the transfer switch is connected to the second contact $b_2$; in this manner, connection of the transfer switch is sequentially turned, on the basis of the timing signal ES.

At here, a control circuit 8, to which the information of transfer rate for the digital data D1 is given from the exterior, sends the first control signal S1 according to this transfer rate to the first variable current source 9, and besides sends the second control signal S2 based on the quantity of high-frequency-component highlighting according to the transfer rate (as the transfer rate becomes relatively high, the quantity of highlighting becomes large) to the second variable current source 10.

Hereby, the first variable current source 9 generates the first current $I_0$ that is an origin of the recording current on the basis of the first control signal S1, and the second variable current source 10 generates the second current $I_{E0}$ that represents the quantity of high-frequency-component highlighting according to the transfer rate, on the basis of the second control signal S2.

And, in this case, the first voltage source (not shown) for generating the stated positive voltage $V_{CC}$ is connected to the intermediate tap 7A of the transducer 7, and the second voltage source (not shown) for generating the stated negative voltage $V_{EE}$ is connected to a terminal 11 to which the output terminals of the first and the second variable current sources 9 and 10 have been connected.

Therefore, while the transfer switch of the first switching unit 5 is connected to the first contact $a_1$, the first current $I_0$ that is generated from the first variable current source 9 flows from the intermediate tap 7A of the transducer 7 to the terminal 11 through the first contact $a_1$ and the output terminal $c_1$ of the first switching unit 5 and the first variable current source 9 sequentially, and, while the transfer switch of the first switching unit 5 is connected to the second contact $b_1$, it flows from the intermediate tap 7A of the transducer 7 to the terminal 11 through the second contact $b_1$, the output terminal $c_1$ and the first variable current source 9 sequentially.

While, during the transfer switch of the second switching unit 6 is connected to the first contact $a_2$, the second current $I_{E0}$ that is generated from the second variable current source 10 flows from the first contact $a_2$ that has been connected to the ground to the terminal 11 through the output terminal c and the second variable current source 10 sequentially, and, while the transfer switch of the second switching unit 6 is connected to the second contact $b_2$, it flows from the intermediate tap 7A of the transducer 7 to the terminal 11 through the first or the second contact $a_1$ or $b_1$ of the first switching unit 5, the second contact $b_2$ and the output terminal c of the second switching unit 6, and the second variable current source 10, sequentially. In this connection, as to the second contact $b_2$ of the second switching unit 6, the second current $I_{E0}$ flows there intermittently in accordance with the switching operation of the second switching unit 6, as shown in FIG. 2D.

As a result of this, through a connection point 12 to which the first switching unit 5, the second switching unit 6 and the first variable current source 9 have been connected, as shown in FIG. 2E, the first current $I_0$ flows just as it is as a recording original current $I_1$, while the transfer switch of the second switching unit 6 is connected to the first contact $a_2$, and, on the other hand, while the transfer switch of the second switching unit 6 is connected to the second contact $b_2$, the first current $I_0$ increases by the second current $I_{E0}$ (that is, the value of the current becomes $I_0+I_{E0}$), and this flows as the recording original current $I_1$.

And, the transducer 7 reverses the direction of the recording original current $I_1$ that flows through the primary side, in response to the switching operation of the first switching unit 5, so as to reverse the polarity of the recording original current $I_1$ in response to rising to the logical level [1] and falling to the logical level [0] of the record data D2, as shown in FIG. 2F, in accordance with the stated conversion ratio that has been previously set between one or the other coil and the secondary coil, thereby converting it to a recording current $I_2$ that is formed by highlighting the high-frequency component of the edge portion, and then gives this to a recording head 14 from the secondary side via a rotary transformer 13.

At this time, the relative velocity of the magnetic tape and the recording head 14 in the direction of the recording track is controlled variably, in response to the transfer rate related to the digital data D1, so that the recording head 14 forms magnetization pattern on the magnetic tape, on the basis of the recording current $I_2$ whose maximum frequency corresponds to the transfer rate and whose high-frequency component of the edge portion is highlighted.

In this manner, this data recorder 1 can previously highlight the high-frequency component of the recording current in accordance with the transfer rate in even the case where the transfer rate varies, and thus it can equalize the high-frequency-component highlighting operations.

By the way, this data recorder 1 is possible to solve the problem that occurs when the above-mentioned linear first and second recording amplifiers are employed, because of employing the recording amplifier 3 that is comprised of a switching amplifier; however, it only equalizes highlighting operations of high-frequency-components of recording currents, and such a problem has been left that it is hard to equalize band limitations of recording current.

SUMMARY OF THE INVENTION

In view of the foregoing, an object of this invention is to provide to a data recording apparatus that is able to form nearly identical magnetization pattern on a recording medium by using the recording amplifier comprised of a switching amplifier even in the case where the transfer rate varies.

The foregoing object and other objects of the invention have been achieved by the provision of a data recording apparatus for recording record data that is supplied at an arbitrary transfer rate on a recording medium. The data recording apparatus comprises a clock signal generating means for being supplied with a first clock signal corresponding to the record data and generating a second clock signal by multiplying the period of the supplied first clock signal by the stated numeric corresponding to the transfer rate, a timing signal forming means for forming at least one species of first timing-signal that shows the highlighting position of the high-frequency component of the record data corresponding to the transfer rate and at least one species of second timing-signal which shows a position at which band limitation of the record data is performed according to the transfer rate, on the basis of the record data and the second clock signal, a recording current generating means for highlighting the high-frequency component and generating recording current corresponding to the record data, which has been subjected to the band limitation, on the basis of the record data, the first timing-signal and the second timing-signal, and a recording means for recording the record data on the recording medium in accordance with the recording current.

As a result of this, by using the recording amplifier comprised of a switching amplifier, it is able to equalize highlighting operation of high-frequency component of recording current in even the case where the transfer rate varies, and also to equalize band limitation, and to keep the frequency characteristics of the recording current approximately constant at the time of recording.

The nature, principle and utility of the invention will become more apparent from the following detailed description when read in conjunction with the accompanying drawings like parts are designated by like reference numerals or characters.

BRIEF DESCRIPTION OF THE DRAWINGS

In the accompanying drawings:

FIGS. 5A to 5G are waveform charts illustrating a process of generating recording current when performing 1/1 multiplication;

FIGS. 6A to 6G are waveform charts illustrating a process of generating recording current when performing 1/2 multiplication;

DETAILED DESCRIPTION OF THE EMBODIMENT

Preferred embodiments of this invention will be described with reference to the accompanying drawings:

(1) Configuration of Data Recorder According to the Embodiment

Figure 1:
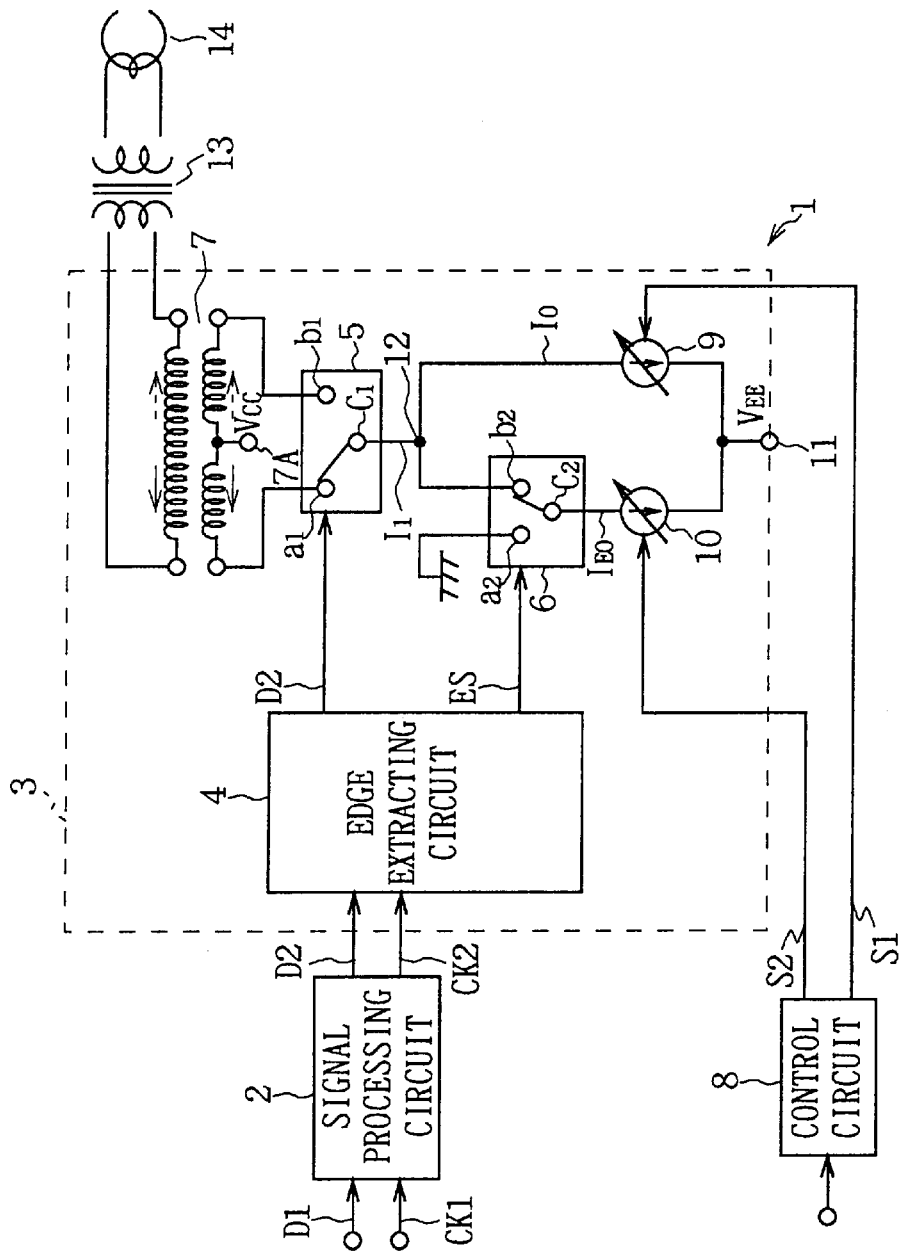
FIG. 1 is a block diagram showing a configuration of the conventional data recorder.
Figure 2A:
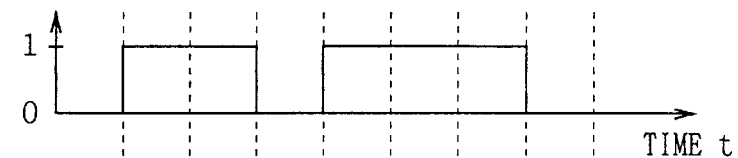
FIGS. 2A to 2F are waveform charts explaining a process of generating recording current of the conventional data recorder.
Figure 2B:
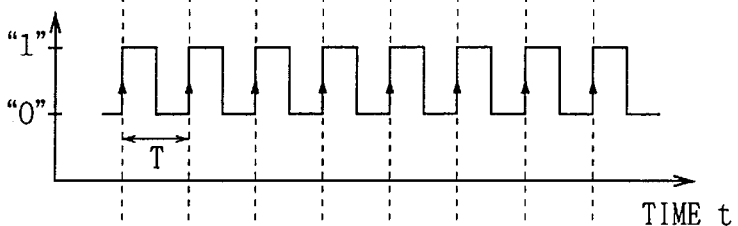
Figure 2C:
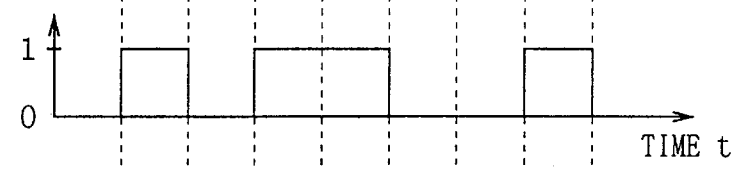
Figure 2D:
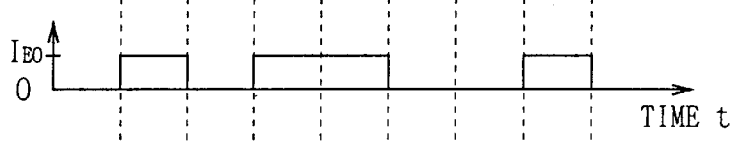
Figure 2E:
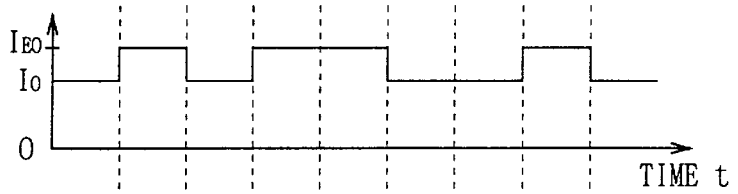
Figure 2F:
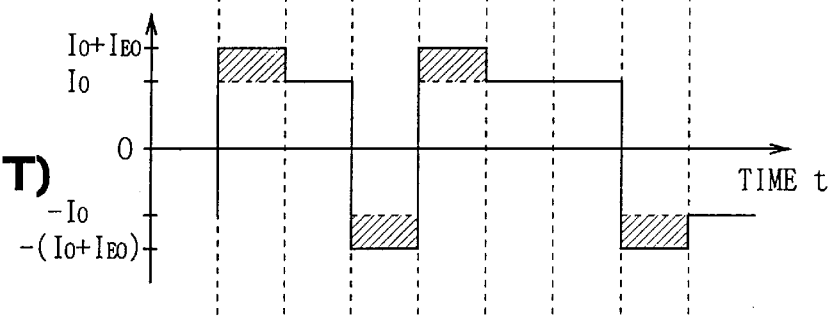
Figure 3:
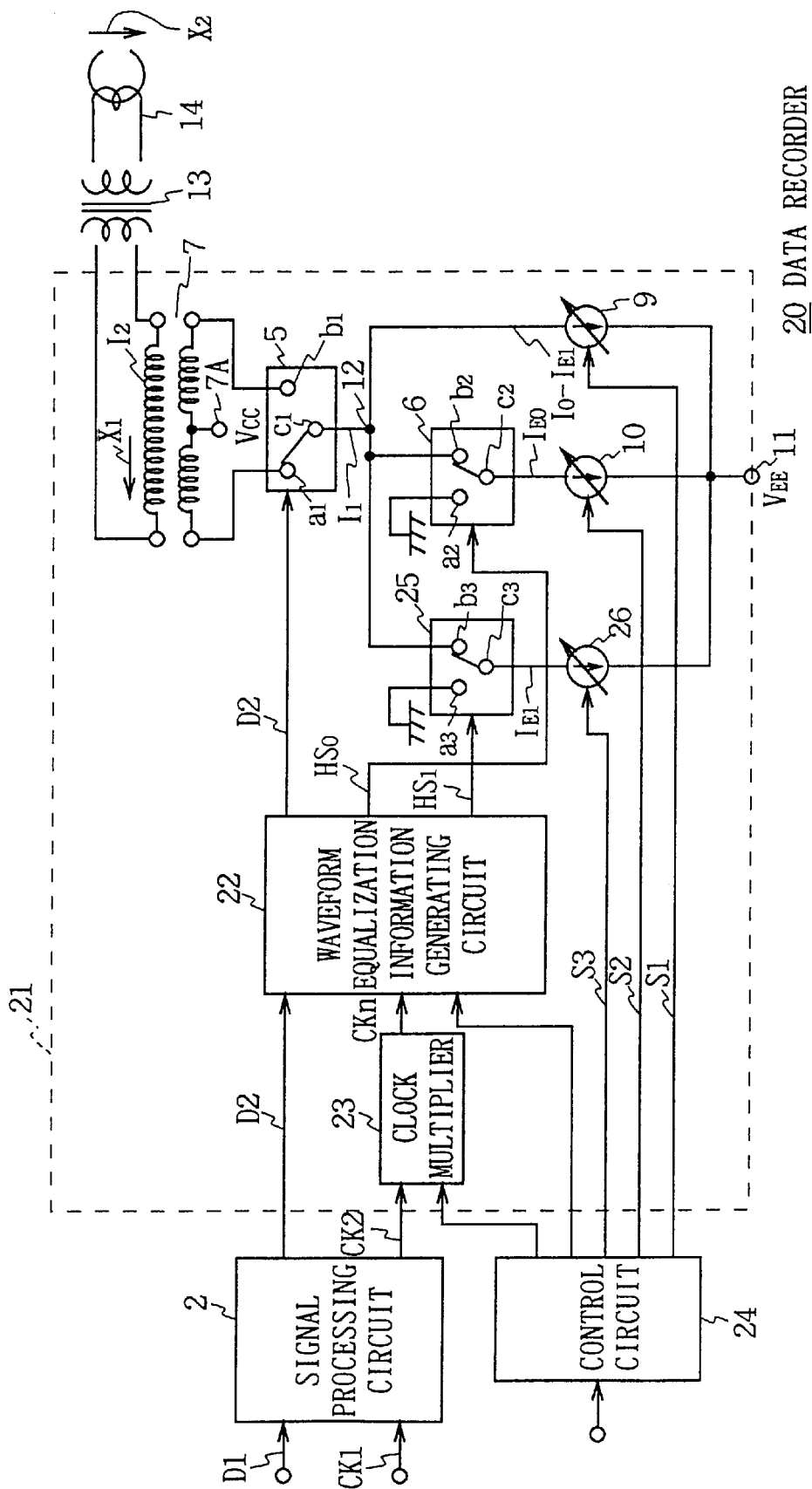
FIG. 3 is a block diagram showing a configuration of an embodiment of a data recorder according to the present invention.

In FIG. 3 in which the same reference numerals are applied to parts corresponding to FIG. 1, numeral 20 shows a data recorder of the embodiment is generally designated as 20. In a signal processing circuit 2, digital data D1 supplied from the exterior at the stated transfer rate and an input clock signal CK1 corresponding to the digital data D1 are inputted.

The signal processing circuit 2 subjects the digital data D1 to recording signal processing, such as paralleling process, error-correction-signal generating and adding process, and non return to zero (NRZ) modulation, to produce record data D2, and then sends this data to a waveform equalization information generating circuit 22 of a recording amplifier 21 that is comprised of a switching amplifier, and besides it converts the input clock signal CK1 into the first clock signal CK2 corresponding to the record data D2, and then sends this signal CK2 to a clock multiplier 23.

In this case, information on transfer rate related to the digital data D1 (this is referred to as transfer rate information, hereinafter) is given to the clock multiplier 23 from a control circuit 24, so that the clock multiplier 23 multiplies the period of the first clock signal CK2 by the stated numeric that has been previously set in accordance with this transfer rate information (by 1/1, 1/2, or 1/4), and sends the resultant second clock signal CKn to the waveform equalization information generating circuit 22.

The waveform equalization information generating circuit 22, which operates on the basis of the second clock signal CKn, rises from the logical level [0] to the logical level [1] in synchronization with the second clock signal CKn, so as to generate the first timing-signal $HS_0$ that shows the high-frequency-component highlighting position, and to generate the second timing-signal $HS_1$ for performing band limitation.

Then, the waveform equalization information generating circuit 22 sends the record data D2 to the first switching unit 5, sends the first timing-signal $HS_0$ to the second switching unit 6, and sends the second timing-signal $HS_1$ to the third switching unit 25.

The first contact $a_1$ of the first switching unit 5 is connected to one of two coils that have been equipped on the primary side of a transducer 7 and coupled together with an intermediate tap 7A, and the second contact $b_1$ is connected to the other coil; while the record data D2 lowers to the logical level [0], the transfer switch that has been mounted on the output terminal $c_1$ is connected to the first contact $a_1$, and, while the record data D2 raises to the logical level [1], the transfer switch is connected to the second contact $b_1$; in this manner, connection of the transfer switch is sequentially turned on the basis of the record data D2.

The second switching unit 6, whose first contact $a_2$ is connected to the ground and whose second contact $b_2$ is connected to the transfer switch of the first switching unit 5, sequentially turns connection of its transfer switch that has been mounted on the output terminal $c_2$, on the basis of the first timing-signal $HS_0$, such that the transfer switch is connected to the first contact $a_2$ while the first timing-signal $HS_0$ lowers to the logical level [0], and the transfer switch is connected to the second contact $b_2$ while the first timing-signal $HS_0$ raises to the logical level [1].

Besides, the third switching unit 25, whose first contact $a_3$ is connected to the ground and whose second contact $b_3$ is connected to the transfer switch of the first switching unit 5, sequentially turns connection of its transfer switch that has been mounted on the output terminal $c_3$ on the basis of the second timing-signal $HS_1$, such that the transfer switch is connected to the first contact $a_3$ while the second timing-signal $HS_1$ lowers to the logical level [0], and the transfer switch is connected to the second contact $b_3$ while the second timing-signal $HS_1$ raises to the logical level [1].

At this time, the control circuit 24 sends the first control signal S1 corresponding to the transfer rate information to the first variable current source 9, sends the second control signal S2 based on the quantity of high-frequency-component highlighting that is corresponding to the transfer rate information to the second variable current source 10, and, besides, sends the third control signal S3 based on the correction value of the high-frequency component of the band corresponding to the transfer rate information to the third variable current source 26.

Thus, the first variable current source 9 generates the first current $I_0-I_{E1}$ that is an origin of the recording current, on the basis of the first control signal S1.

On the basis of the second control signal S2, the second variable current source 10 generates the second current $I_{E0}$ that represents the highlighting quantity of the high-frequency component corresponding to the transfer rate so as to equalize highlighting operation of the high-frequency component in even the case where the transfer rate varies.

On the basis of the third control signal S3, the third variable current source 26 generates the third current $I_{E1}$ that represents the correction value of the high-frequency component of the band corresponding to the transfer rate so as to equalize limitation of the band in even the case where the transfer rate varies.

By the way, a first voltage source (not shown) for generating the stated positive voltage $V_{CC}$ is connected to the intermediate tap 7A of the transducer 7, and a second voltage source (not shown) for generating the stated negative voltage $V_{EE}$ is connected to a terminal 11 to which the output terminals of the first, the second and the third variable current sources 9, 10 and 26 are connected.

So, in the case where only the first current $I_0-I_{E1}$ which is generated by the first variable current source 9 is considered, the first current $I_0-I_{E1}$ flows from the intermediate tap 7A of the transducer 7 to the terminal 11 through the first contact $a_1$ and the output terminal $c_1$ of the first switching unit 5 and the first variable current source 9 in sequence, while the transfer switch of the first switching unit 5 is connected to the first contact $a_1$; on the other hand, while the transfer switch of the first switching unit 5 is connected to the second contact $b_1$, the current flows from the intermediate tap 7A of the transducer 7 to the terminal 11 through the second contact $b_1$, the output terminal $c_1$ and the first variable current source 9 in sequence.

In the case where only the second current $I_{E0}$ which is generated by the second variable current source 10 is considered, the second current $I_{E0}$ flows from the first contact $a_2$ which is grounded to the terminal 11 through the output terminal $c_2$ and the second variable current source 10 in sequence, while the transfer switch of the second switching unit 6 is connected to the first contact $a_2$; on the other hand, while the transfer switch of the second switching unit 6 is connected to the second contact $b_2$, the current flows from the intermediate tap 7A of the transducer 7 to the terminal 11 through the first or the second contact $a_1$ or $b_1$ of the first switching unit 5, the second contact $b_2$ and the output terminal $c_1$ of the second switching unit 6, and the second variable current source 10 in sequence.

In the case where only the third current $I_{E1}$ which is generated by the third variable current source 26 is considered, the third current $I_{E1}$ flows from the first contact $a_3$ which is grounded to the terminal 11 through the output terminal $c_3$ and the third variable current source 26 in sequence, while the transfer switch of the third switching unit 25 is connected to the first contact $a_3$; on the other hand, while the transfer switch of the third switching unit 25 is connected to the second contact $b_3$, the current flows from the intermediate tap 7A of the transducer 7 to the terminal 11 through the first or the second contact $a_1$ or $b_1$ of the first switching unit 5, the second contact $b_3$ and the output terminal $c_3$ of the third switching unit 25, and the third variable current source 26 in sequence.

Therefore, when the transfer switch of the second switching unit 6 is actually connected to the first contact $a_2$ and the transfer switch of the third switching unit 25 is connected to the first contact $a_3$, the first current $I_0-I_{E1}$ flows just as it is, as the recording original current $I_1$, between the intermediate tap 7A placed on the primary side of the transducer 7 and the connection point 12, to which the output terminal $c_1$ of the first switching unit 5, the second contacts $b_2$ and $b_3$ of the second and the third switching units 6 and 25, and the first variable current source 9 have been connected.

When the transfer switch of the second switching unit 6 is connected to the second contact $b_2$ and the transfer switch of the third switching unit 25 is connected to the first contact $a_3$, the recording original current $I_1$ that is comprised of the first current $I_0-I_{E1}$ plus the second current $I_{E0}$ (that is, the current value becomes $I_0-I_{E1}+I_{E0}$) flows between the connection point 12 and the intermediate tap 7A.

When the transfer switch of the second switching unit 6 is connected to the first contact $a_2$ and the transfer switch of the third switching unit 25 is connected to the second contact $b_3$, the recording original current $I_1$ that is comprised of the first current $I_0-I_{E1}$ plus the third current $I_{E1}$ (that is, the current value becomes $I_0$) flows between the connection point 12 and the intermediate tap 7A.

When the transfer switch of the second switching unit 6 is connected to the second contact $b_2$ and the transfer switch of the third switching unit 25 is connected to the second contact $b_3$, the recording original current $I_1$ that is comprised of the first current $I_0-I_{E1}$ plus the second current $I_{E0}$ plus the third current $I_{E1}$ (that is, the current value becomes $I_0+I_{E0}$) flows between the connection point 12 and the intermediate tap 7A.

In this connection, at the primary side of the transducer 7, while the transfer switch of the first switching unit 5 is connected to the first contact $a_1$, the recording original current $I_1$ flows through one coil leftwards as shown by the arrow $X_1$, on the other hand, while the transfer switch of the first switching unit 5 is connected to the second contact $b_1$, the current $I_1$ flows through the other coil leftwards.

And, the transducer 7 is able to convert the recording original current $I_1$ which flows the primary side into the recording current $I_2$, in accordance with the stated conversion ratio mt that has been previously set, as represented by the following equation (1);

$$I_2 = I_1 mt \tag{1}$$

between one coil of the primary side and the coil of the secondary side, and also between the other coil of the primary side and the coil of the secondary side, and is able to make the recording current $I_2$ flow through the coil of the secondary side.

In fact, while the recording original current $I_1$ is flowing through one coil of the primary side (leftwards), the transducer 7 converts this current $I_1$ into the recording current $I_2$ that is formed by highlighting the high-frequency component of the edge portion in accordance with the transfer rate and by correcting the high-frequency component of the band (that is, by limiting the band) and that is formed with the plus-side waveform components, and then supplies this current $I_2$ to a rotary transformer 13 from the coil of the secondary side (makes it flow leftwards).

Besides, while the recording original current $I_1$ is flowing through the other coil of the primary side (rightwards), the transducer 7 similarly converts this current $I_1$ into the recording current $I_2$ that is formed by similarly highlighting the high-frequency component of the edge portion in accordance with the transfer rate and by correcting the high-frequency component of the band (that is, by limiting the band) and that is formed with the minus-side waveform components, and then supplies this current $I_2$ to the rotary transformer 13 from the coil of the secondary side (makes it flow rightwards).

In accordance with the previously set conversion ratio mr, the rotary transformer 13 converts the recording current $I_2$ (that is comprised of the plus-side waveform and the minus-side waveform) into that which is obtained by the following expression (2);

$$I_2 \cdot mr \tag{2}$$

and then supplies it to a recording head 14.

At this time, the relative velocity of the recording head 14 to the magnetic tape in the direction of the recording track is controlled variably in accordance with the transfer rate; in this state, the plus-side waveform component of the recording current $I_2$ is given, via the rotary transformer 13, to the recording head 14 such that it flows downwards as shown by the arrow $X_2$, or the minus-side waveform component of the recording current $I_2$ is given such that it flows upwards, so that the magnetization pattern based on the recording current $I_2$ is formed on the magnetic tape.

Thus, even in the case where the transfer rate varies, the data recorder 20 is able to equalize highlighting operation of high-frequency component of the edge portion of the recording current $I_2$ and also able to equalize band limitation so as to form the magnetization pattern on the magnetic tape.

Figure 4:
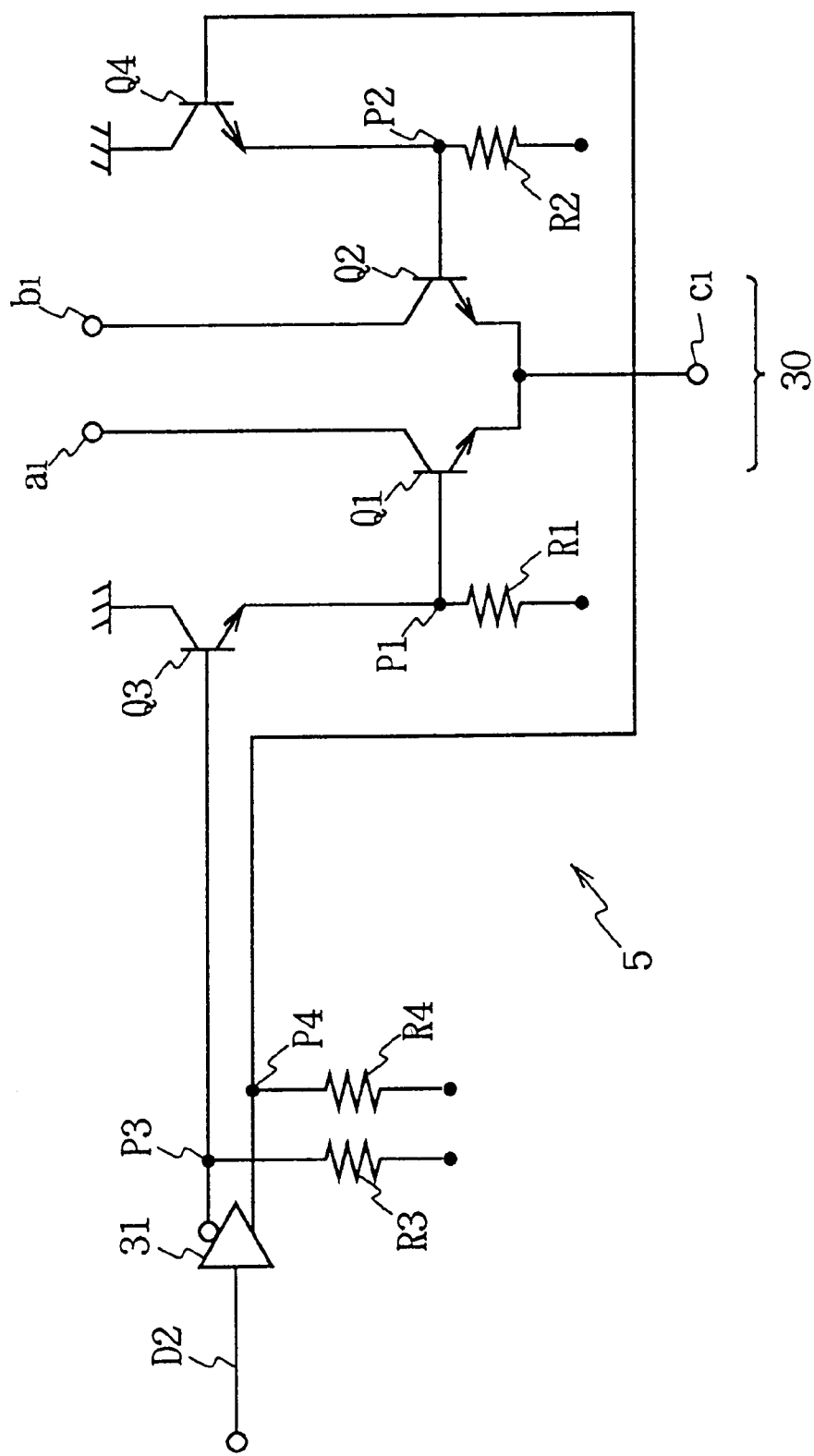
FIG. 4 is a connection diagram showing a configuration of the first switching unit.
Figures 7A, 7B, 7C, 7D, 7E, 7F, 7G:
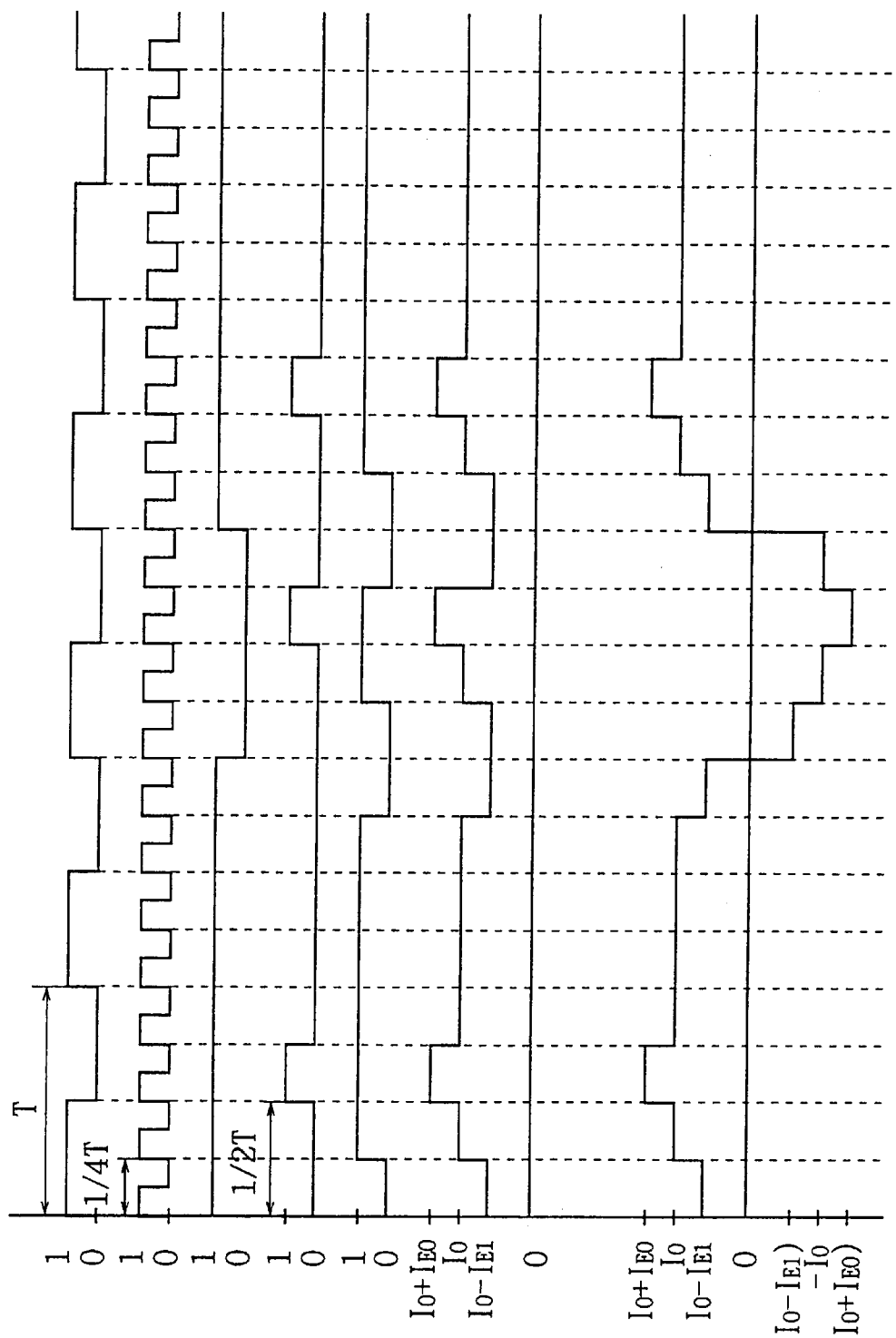
FIGS. 7A to 7G are waveform charts illustrating a process of generating recording current when performing 1/4 multiplication.
Figure 8:
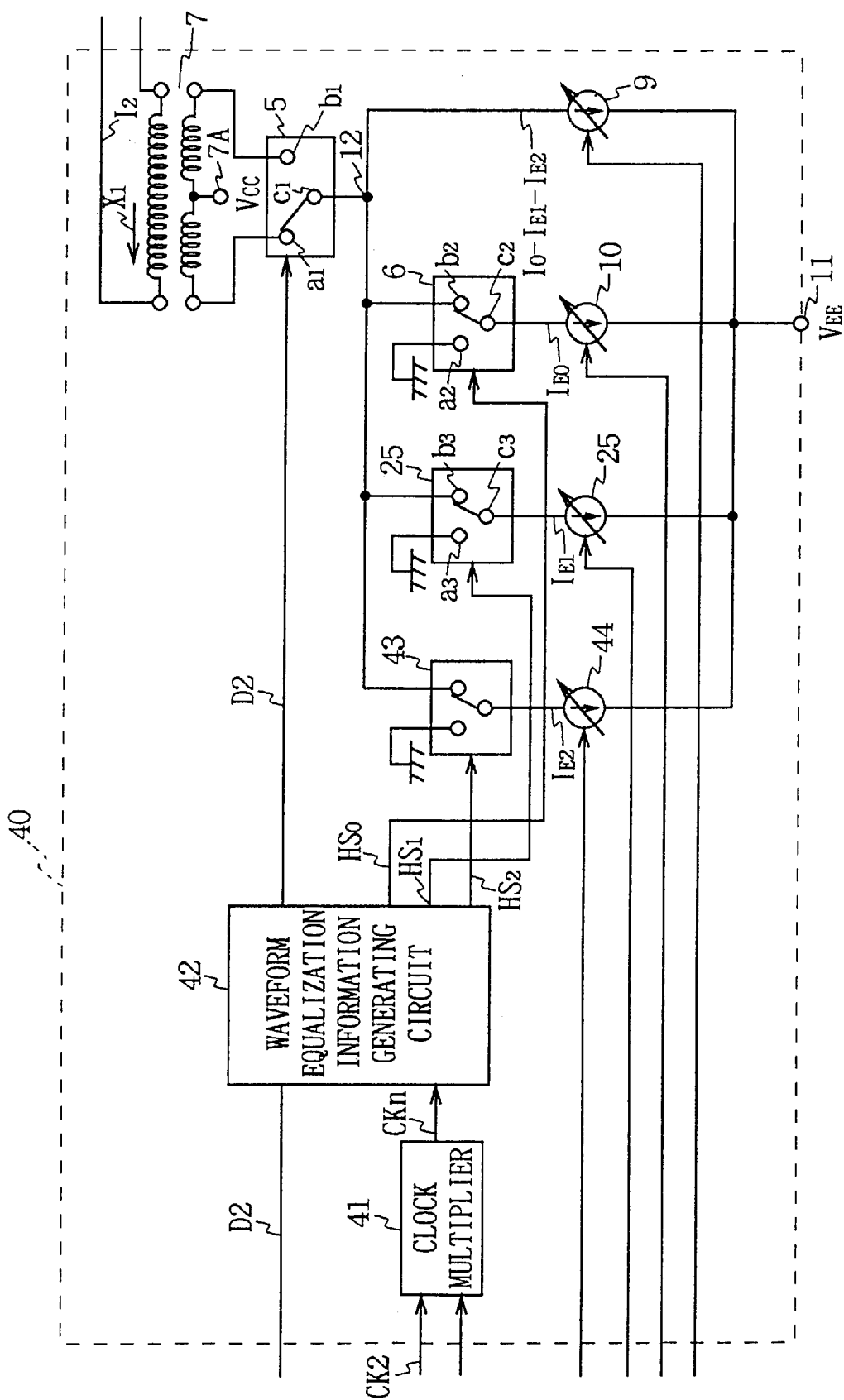
FIG. 8 is a block diagram showing a configuration of the recording amplifier of the data recorder according to another embodiment.
Figures 9A, 9B, 9C, 9D, 9E, 9F, 9G, 9H:
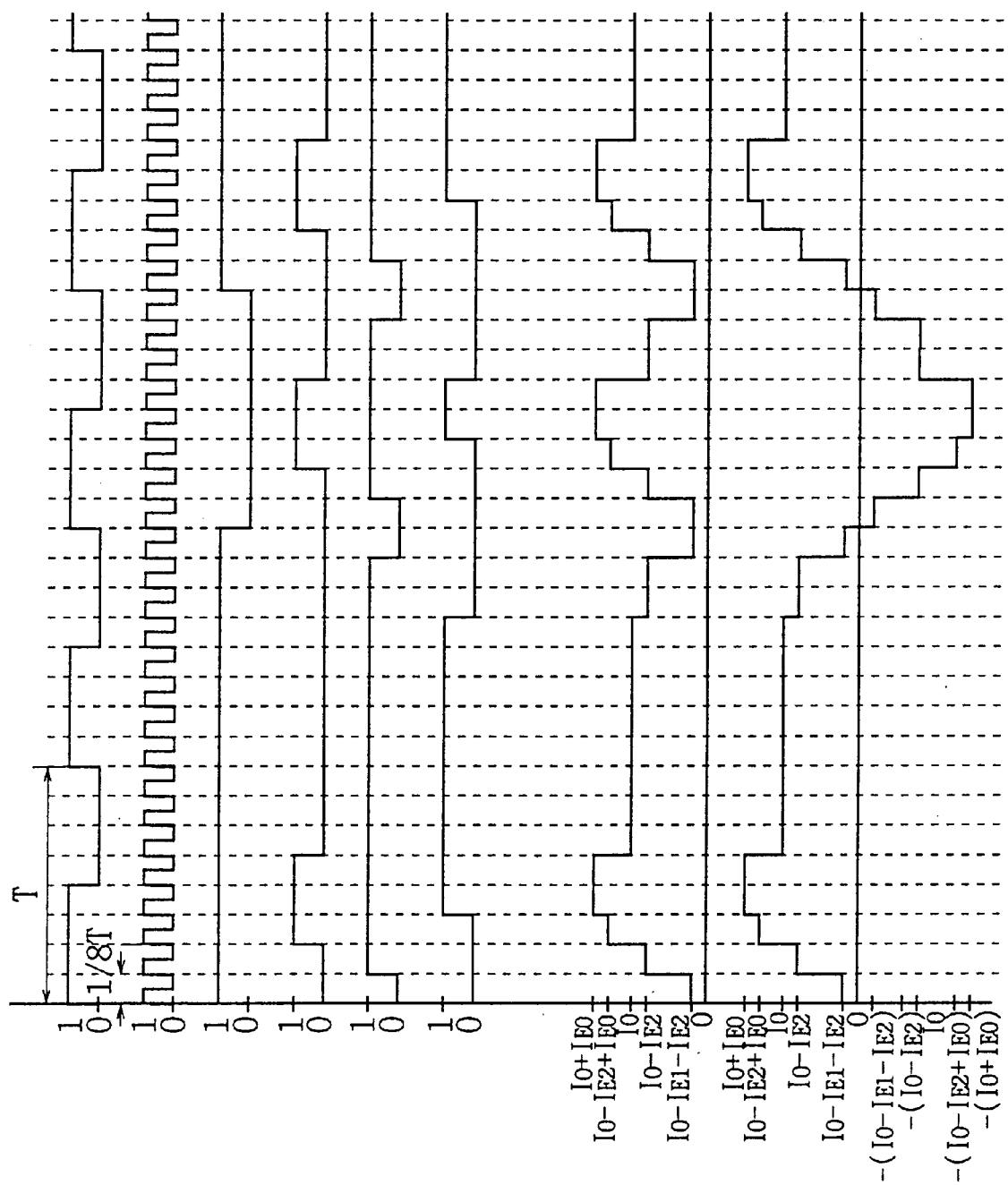
FIGS. 9A to 9H are waveform charts illustrating a process of generating recording current when performing 1/8 multiplication according to another embodiment.

Referring to FIG. 4, the first switching unit 5 of the data recorder 20 has the emitter-connection differential transistor configuration including an operational output stage 30 that is formed by connecting the emitters of a pair of NPN-type transistors Q1 and Q2; the first contact $a_1$ is connected to the collector of the transistor Q1 of this operational output stage 30, and the second contact $b_1$ is connected to the collector of the transistor Q2, and the output terminal $c_1$ is connected to the emitters of the pair of transistors Q1 and Q2.

In this first switching unit 5, the base of a NPN-type emitter follower transistor Q3, whose collector has been grounded, is connected to the inverted output terminal of a level converter 31 for converting the level of the supplied record data D2 from transistor transistor logic circuit (TTL) level to emitter coupled logic circuit (ECL) level, and, the second voltage source is connected to the emitter of the emitter follower transistor Q3 via an emitter resistor R1, and besides, the base of the transistor Q1 is connected to the connection point P1 of this emitter and the emitter resistor R1.

Besides, in this first switching unit 5, the base of a NPN-type emitter follower transistor Q4, whose collector has been grounded, is connected to the non-inverted output terminal of the level converter 31, and, the second voltage source is connected to the emitter of the emitter follower transistor Q4 via an emitter resistor R2, and besides, the base of the transistor Q2 is connected to the connection point P2 of this emitter and the emitter resistor R2.

The second voltage source is connected via a terminating resistor R3 to the connection point P3, to which the inverted output terminal of the level converter 31 and the base of the emitter follower transistor Q3 have been connected, and besides, the second voltage source is connected via a terminating resistor R4 to the connection point P4, to which the non-inverted output terminal and the base of the emitter follower transistor Q4 have been connected. At the time of the logical level [0], the voltage of about −1.8 V is given to the terminating resistors R3 and R4 and the connection points P3 and P4, and, at the time of the logical level [1], the voltage of about −0.8 V is given to those.

While the supplied record data D2 lowers to logical level [0], the level converter 31 supplies the voltage of about −0.8 V to the base of the emitter follower transistor Q3 from the inverted output terminal in accordance with logical level [1] which is formed by inverting this logical level [0], and supplies the voltage of about −1.8 V to the base of the emitter follower transistor Q4 from the non-inverted output terminal in accordance with the logical level [0].

At this time, from the emitter of the emitter follower transistor Q3, the voltage of about −1.6 V, which is lower than the voltage supplied to its base by about 0.8 V, is supplied to the base of the transistor Q1, and, from the emitter of the emitter follower transistor Q4, the voltage of about −2.6 V, which is lower than the voltage supplied to its base by about 0.8 V, is supplied to the base of the transistor Q2.

Therefore, with regard to the transistors Q1 and Q2, the electric potential of the base of the transistor Q1 becomes sufficiently higher than the electric potential of the base of the transistor Q2, so that, from only the first contact $a_1$, the recording original current $I_1$ flows to the output terminal $c_1$ via the collector and the emitter of the transistor Q1 in sequence.

While the supplied record data D2 raises to logical level [1], the level converter 31 supplies the voltage of about −1.8V to the base of the emitter follower transistor Q3 from the inverted output terminal in accordance with logical level [0] which is formed by inverting the logical level [1], and supplies the voltage of about −0.8 V to the base of the emitter follower transistor Q4 from the non-inverted output terminal in accordance with the logical level [1].

At this time, from the emitter of the emitter follower transistor Q3, the voltage of about −2.6 V, which is lower than the voltage supplied to its base by about 0.8 V, is supplied to the base of the transistor Q1, and, from the emitter of the emitter follower transistor Q4, the voltage of about −1.6 V, which is lower than the voltage supplied to its base by about 0.8 V, is supplied to the base of the transistor Q2.

Therefore, with regard to the transistors Q1 and Q2, the electric potential of the base of the transistor Q2 becomes sufficiently higher than the electric potential of the base of the transistor Q1, so that, from only the second contact $b_1$, the recording original current $I_1$ flows to the output terminal $c_1$ via the collector and the emitter of the transistor Q2 in sequence.

Thus, the first switching unit 5 is able to perform switching operation on the basis of the record data D2 in sequence.

As to the second and the third switching units 6 and 25, the first contacts $a_2$ and $a_3$ are connected to the ground, and the second contacts $b_2$ and $b_3$ are connected to the output terminal $c_1$ of the first switching unit 5, therefore, the voltage that is supplied to the first and the second contacts $a_2$, $a_3$, $b_2$ and $b_3$ becomes lower than the voltage that is supplied to the first and the second contacts $a_1$ and $b_1$ of the first switching unit 5.

So, in the second and the third switching units 6 and 25, in addition to the above-mentioned configuration of the first switching unit 5 shown in FIG. 4, two diodes are connected in series between the connection points P1 and P2 corresponding to the emitters of the emitter follower transistors Q3 and Q4. Therefore, the voltage that is dropped from the voltage of the emitter of the emitter follower transistor Q3 or Q4 by an amount that corresponds to the two diodes is supplied to the base of the corresponding transistor Q1 or Q2.

As to the clock multiplier 23 and the waveform equalization information generating circuit 22 of this embodiment, the upper limit of the operating frequency is previously set to the stated frequency.

Hence, the clock multiplier 23 is set such that, when the frequency of the first clock signal CK2 is about 60 MHz or more, it performs 1 multiplies the period of the first clock signal CK2 by 1/1, and, when the frequency of the first clock signal CK2 ranges from about 30 MHz to about 60 MHz, it multiplies the period of the first clock signal CK2 by 1/2, and, when the frequency of the first clock signal CK2 is about 30 MHz or less, it multiplies the period of the first clock signal CK2 by 1/4, on the basis of the transfer rate information.

Thus, in the data recorder 20, it is able to cause the recording amplifier 21 to operate on the basis of the first clock signal CK2 that has approximately the same period, even in the case where the transfer rate varies, and so it is able to cause the recording amplifier 21 to operate stably without being influenced by the transfer rate.

By the way, in order to limit the band of the recording current $I_2$, it is necessary to suppress (decrease) the raising (increase) of the amplifier due to the high-frequency component, and the current value required for band limitation has to be subtracted from the recording original current $I_1$. However, in this embodiment of the present invention, the recording amplifier 21 has the configuration of only adding current.

Therefore, in the recording amplifier 21, the current value in the case of limiting the band is set to the value $I_0-I_{E1}$ which is obtained by subtracting the current value $I_{E1}$ required for band limitation from the current value $I_0$ it the case where any of the highlighting operation of high-frequency component and the band limitation is not performed, to generate this by the variable current source 9. In the case where the band limitation is performed, only the current $I_0-I_{E1}$ of the variable current source 9 is set as the recording original current $I_1$, and on the other hand, in the case where the band limitation is not performed, the current $I_{E1}$, which is generated at the variable current source 26, is added to the current $I_0-I_{E1}$ to obtain the current $I_0$, and this is defined as the recording original current $I_1$. Thereby, the current amplifier 21 has the configuration of adding current but equally performs the current subtraction, and thus suppresses the raising of the amplifier due to the high-frequency component.

(2) Generating Process of Record Signal

Here, a process of generating a recording signal in the data recorder 20 will be described with reference to the waveforms in FIGS. 5A to 5G, 6A to 6G, and 7A to 7G. Note that, FIGS. 5A to 5G show the case of multiplying a first clock CK2 by 1/1, FIGS. 6A to 6G show the case of multiplying the first clock CK2 by 1/2, and FIGS. 7A to 7G show the case of multiplying the first clock CK2 by 1/4. Note that, in the data recorder 20, as shown in FIGS. 5A to 5G, in the case where the transfer rate of the supplied digital data D1 is relatively high and the frequency of the first clock signal CK2 is about 60 MHz or more, the clock multiplier 23 multiplies the period T of the first clock signal CK2 (FIG. 5A) by 1/1 on the basis of the transfer rate information, and sends the resultant second clock signal CKn (FIG. 5B) (having the same as the period T of the first clock signal CK2) to the waveform equalization information generating circuit 22.

On the basis of the second clock signal CKn, the waveform equalization information generating circuit 22 detects the time at which the record data D2 (FIG. 5C) rises to logical level [1] and the time at which it falls to logical level [0], and then, on the basis of this result of the detection, generates the first timing-signal $HS_0$ (FIG. 5D) that is synchronized with the second clock signal CKn; the first timing-signal $HS_0$ is raised to logical level [1] for one period T of the second clock signal CKn, from the time point at which the record data D2 rises to logical level [1] and also from the time point at which it falls to logical level [0]; by this logical level [1], the first timing-signal $HS_0$ shows the high-frequency-component highlighting position that is according with the transfer rate.

In addition, on the basis of that result of the detection, the waveform equalization information generating circuit 22 generates the second timing-signal $HS_1$ (FIG. 5E) that is synchronized with the second clock signal CKn; the second timing-signal $HS_1$ lowers to logical level [0], for one period T of the second clock signal CKn preceding and succeeding the time point at which the record data D2 rises to logical level [1] and also the time point at which it falls to logical level [0], and raises to logical level [1] for the other duration; by this logical level [1], the second timing-signal $HS_1$ would perform band limitation in accordance with the transfer rate.

Then, on the basis of the record data D2, the first timing-signal $HS_0$ and the second timing-signal $HS_1$, the corresponding first switching unit 5, the second switching unit 6 and the third switching unit 25 perform their switching operations, and so, it is able to generate the recording original current $I_1$ (FIG. 5F) that is formed by adding the second current $I_{E0}$ to the highlighting position of the high-frequency component of the first current $I_0-I_{E1}$ and by adding the third current $I_{E1}$ to the position at which the band of the first current $I_0-I_{E1}$ is limited, in the primary side of the transducer 7.

Then, the recording original current $I_1$ is converted into the recording current $I_2$ (FIG. 5G) that is formed by highlighting the high-frequency component and by limiting the band in accordance with the transfer rate, by the transducer 7; the recording current $I_2$ is given to the recording head 14 from the secondary side of this transducer 7 via the rotary transformer 13.

Besides, in this data recorder 20, as shown in FIGS. 6A to 6G, in the case where the transfer rate of the digital data D1 is lower than that of the above-mentioned case shown in FIGS. 5A to 5G and the frequency of the first clock signal CK2 ranges from about 30 MHz to about 60 MHz, the clock multiplier 23 multiplies the period T of the first clock signal CK2 (FIG. 6A) by 1/2 on the basis of the transfer rate information (one period becomes 1/2 of the period T of the first clock signal CK2), and sends the resultant second clock signal CKn (FIG. 6B) to the waveform equalization information generating circuit 22.

By the way, in the case where the transfer rate is relatively high (the frequency of the first clock signal CK2 is about 60 MHz or more), a resonance circuit is produced by the inductance of the recording head 14 and the stray capacity of the recording head 14, the rotary transformer 13 and others, therefore, a delay occurs in the phase of the high-frequency component of the recording current, in comparison with that of the case where the transfer rate is relatively low (the case where the frequency of the first clock signal CK2 is lower than 60 MHz or so).

Therefore, to generate the first timing-signal $HS_0$, the waveform equalization information generating circuit 22 detects the time at which the record data D2 (FIG. 6C) rises to logical level [1] and the time at which it falls to logical level [0] on the basis of the second clock signal CKn, and then, on the basis of this result of the detection, generates the first timing-signal $HS_0$ (FIG. 6D) that is synchronized with the second clock signal CKn; the first timing-signal $HS_0$ is raised to logical level [1] for one period of the second clock signal CKn, that is 1/2 T, from the time that have been delayed by one period 1/2 T from the time at which the record data D2 rises to logical level [1] and the time at which it falls to logical level [0]; by this logical level [1], the first timing-signal $HS_0$ shows the high-frequency-component highlighting position whose phase has been delayed in accordance with the transfer rate.

In addition, on the basis of that result of the detection, the waveform equalization information generating circuit 22 generates the second timing-signal $HS_1$ (FIG. 6E) that is synchronized with the second clock signal CKn; the second timing-signal $HS_1$ lowers to logical level [0] for one period of the second clock signal CKn, that is 1/2T, preceding and succeeding the time at which the record data D2 rises to logical level [1] and also the time at which it falls to logical level [0], and raised to logical level [1] for the other duration; by this logical level [1], the second timing-signal $HS_1$ would perform band limitation that accords with the transfer rate.

Then, on the basis of the record data D2, the first timing-signal $HS_0$ and the second timing-signal $HS_1$, the corresponding first switching unit 5, the second switching unit 6 and the third switching unit 25 perform their switching operations, so as to produce the recording original current $I_1$ (FIG. 6F) that is formed by adding the second current $I_{E0}$ to the highlighting position of the high-frequency component whose phase has been delayed of the first current $I_0-I_{E1}$ and by adding the third current $I_{E1}$ to the band of the first current $I_0-I_{E1}$, on the primary side of the transducer 7.

And, the transducer 7 converts the recording original current $I_1$ into the recording current $I_2$ (FIG. 6G), by highlighting the high-frequency component in accordance with the transfer rate, limiting the band, and delaying the phase of the high-frequency component so as to adjust it to that of the recording current that is generated at the time of multiplying the period of the first clock signal CK2 by 1/1; then, the recording current $I_2$ is given to the recording head 14 from the secondary side of this transducer 7 via the rotary transformer 13.

Besides, in this data recorder 20, as shown in FIGS. 7A to 7G, in the case where the transfer rate of the digital data D1 is lower than that of the time of 1/2-multiplication stated above and the frequency of the first clock signal CK2 is about 30 MHz or less, the clock multiplier 23 multiplies the period T of the first clock signal CK2 (FIG. 7A) by 1/4 on the basis of the transfer rate information (one period becomes 1/4 of the period T of the first clock signal CK2), and sends the resultant second clock signal CKn (FIG. 7B) to the waveform equalization information generating circuit 22.

On the basis of the second clock signal CKn, the waveform equalization information generating circuit 22 detects the time at which the record data D2 (FIG. 7C) rises to logical level [1] and the time at which it falls to logical level [0], and then, on the basis of this result of the detection, generates the first timing-signal $HS_0$ (FIG. 7D) that is synchronized with the second clock signal CKn; the first timing-signal $HS_0$ raises to logical level [1] for one period, that is 1/4 T, from the time points that have been delayed by two periods of the second clock signal CKn, that is 1/2 T, from the time point at which the record data D2 rises to logical level [1] and the time point at which it falls to logical level [0]; the first timing-signal $HS_0$ shows the high-frequency-component highlighting position by this logical level [1].

In this way, the waveform equalization information generating circuit 22 delays the phase of the high-frequency component so as to adjust it to that of the recording current $I_2$ that is generated at the time of 1/1-multiplication by the first timing-signal $HS_0$, like the case of 1/2-multiplication stated above, thereby showing the highlighting position of the high-frequency component.

In addition, on the basis of that result of the detection, the waveform equalization information generating circuit 22 generates the second timing-signal $HS_1$ (FIG. 7E) that is synchronized with the second clock signal CKn; the second timing-signal $HS_1$ lowers to logical level [0] for one period of the second clock signal CKn, that is 1/4 T, preceding and succeeding the time at which the record data D2 rises to logical level [1] and also the time at which it falls to logical level [0], and raises to logical level [1] for the other duration; by this logical level [1], the second timing-signal $HS_1$ would perform band limitation that accords with the transfer rate.

Then, on the basis of the record data D2, the first timing-signal $HS_0$ and the second timing-signal $HS_1$, the corresponding first switching unit 5, the second switching unit 6 and the third switching unit 25 perform their switching operations; as a result, it is able to produce the recording original current $I_1$ (FIG. 7F) that is formed by adding the second current $I_{E0}$ to the highlighting position of the high-frequency component whose phase has been delayed of the first current $I_0-I^{E1}$, and by adding the third current $I_{E1}$ to the band of the first current $I_0-I_{E1}$, on the primary side of the transducer 7, in the same way as the time of 1/2-multiplication stated above, and able to convert this recording original current $I_1$ into the recording current $I_2$ (FIG. 7G) whose high-frequency component has been highlighted in accordance with the transfer rate, and the band has been limited, and besides, whose phase of the high-frequency component has been delayed such that it is adjusted to the phase of the recording current that is generated at the time of 1/1-multiplication, by means of the transducer 7.

(3) Operation and Effects

In the above configuration, the data recorder 20 multiplies the period of the first clock signal CK2 corresponding to the record data D2 by the stated numeric corresponding to the transfer rate, and then, on the basis of the resultant second clock signal CKn and the record data D2, generates the first timing-signal $HS_0$ for indicating the highlighting position of the high-frequency component corresponding to the transfer rate and the second timing-signal $HS_1$ for performing band limitation.

In the data recorder 20, the first variable current source 9 generates the first current $I_0-I_{E1}$ that is an origin of the recording current and that is corresponding to the transfer rate, and the second variable current source 10 generates the second current $I_{E0}$ that represents the highlighting quantity of the high-frequency component corresponding to the transfer rate, and the third variable current source 26 generates the third current $I_{E1}$ that represents the correction value of the high-frequency component of the band corresponding to the transfer rate; in this status, the first, the second and the third switching units 5, 6 and 25 respectively perform switching operations on the basis of the corresponding one out of the record data D2, the first timing-signal $HS_0$ and the second timing-signal $HS_1$, thereby generating the recording original current $I_1$ that is formed by adding the second current $I_{E0}$ to the highlighting position of the high-frequency component of the first current $I_0-I_{E1}$ and by adding the third current $I_{E1}$ to the band of the first current $I_0-I_{E1}$.

Then, in the data recorder 20, the recording original current $I_1$ is converted into the recording current $I_2$ whose high-frequency component of the edge portion has been highlighted in accordance with the transfer rate, and the band has been limited, by the transducer 7; the recording current $I_2$ is given to the recording head 14 via the rotary transformer 13, so that the magnetization pattern is formed on the magnetic tape on the basis of the recording current $I_2$.

Thus, the data recorder 20 highlights the high-frequency component of the edge portion of the recording current $I_2$ by the second current $I_{E0}$ that represents the highlighting quantity corresponding to the transfer rate, and limits the band by the third current $I_{E1}$ that represents the correction value of the high-frequency component of the band corresponding to the transfer rate, in this manner, it equalizes highlighting operation of high-frequency component of the recording current $I_2$ and equalizes band limitation, so that it is able to keep the magnetization pattern on a recording medium approximately constant even if the transfer rate varies.

Besides, in the data recorder 20, when the waveform equalization information generating circuit 22 operates on the basis of the second clock signal CKn that has been formed by multiplying the period of the first clock signal CK2 by 1/2 and 1/4, it generates the first timing-signal $HS_0$ for indicating the highlighting position of the high-frequency component whose phase has been delayed so as to adjust it to the recording current $I_2$ that is generated at the time of 1/1-multiplication; therefore, not only high-frequency-component highlighting and band limiting corresponding to transfer rates, but approximate equalizing of phases of the high-frequency components can be performed even if the transfer rate varies.

Moreover, in the data recorder 20, as can be seen from FIGS. 5A to 5G and FIGS. 6A to 6G stated above, the band is not limited with respect to a waveform that has relatively short wavelength of the recording current $I_2$ (that is, a waveform that rises to logical level [1] during 1 period or 2 periods of the first clock signal CK2) and the band is limited with respect to a waveform that has relatively long wavelength, at the time of 1/1-multiplication and the time of 1/2-multiplication; as can be seen from FIGS. 7A to 7G stated above, the band is limited with respect to a waveform of all wavelength of the recording current $I_2$, at the time of 1/4-multiplication.

That is, in the data recorder 20, in the case where the transfer rate is high (that is, at the time of 1/1-multiplication and the time of 1/2-multiplication), under the influence of resonance that occurs due to the inductance of the recording head 14 and the stray capacity of the recording head 14, the rotary transformer 13 and others, with respect to the waveform having relatively short wavelength of the generated recording current $I_2$, even if the band is not limited, the band becomes the limited condition that is nearly equal to that of the waveform having relatively short wavelength of the recording current $I_2$ generated at the time of 1/4-multiplication. Hence, in the data recorder 20, it is able to prevent excessively performing band limitation toward a waveform having relatively short wavelength of the recording current $I_2$, at the time of 1/1-multiplication and the time of 1/2-multiplication.

Moreover, whenever the transfer rate becomes low (that is, the period of the first clock signal CK2 becomes long), the clock multiplier 23 increases the numeric by which the period of the first clock signal CK2 is multiplied, therefore, the data recorder 20 is able to make the clock multiplier 23 and the waveform equalization information generating circuit 22 operate maintaining stability, with the nearly identical operating frequency within the previously set upper limit of the operating frequency.

Moreover, in the data recorder 20, even if the transfer rate varies, the recording current $I_2$ that is formed by highlighting the high-frequency component and by limiting the band in accordance with the transfer rate can be generate in the recording amplifier 21 that is comprised of a switching amplifier, therefore, it is not required to provide plural filters corresponding to the transfer rates, as the conventional data recorder that uses the first and the second linear recording amplifiers, hence it is able to reduce the consumed power in comparison with the conventional data recorder that uses the first and the second linear recording amplifiers, and to simplify the circuit configuration by eliminating radiation plates, so that whole apparatus can be miniaturized considerably.

According to the above configuration, the period of the first clock signal CK2 corresponding to the record data D2 is multiplied by the stated numeric corresponding to the transfer rate, so that the second clock signal CKn is generated, and then, on the basis of the first clock signal CK2n and the record data D2, the recording current $I_2$ that is formed by highlighting the high-frequency component in accordance with the transfer rate and by limiting the band is generated, therefore, it is able to equalize highlighting operation of high-frequency component of the recording current $I_2$ even in the case where the transfer rate varies, and also to equalize band limitation so as to keep the frequency characteristics approximately constant, in this way, it is able to form nearly identical magnetization pattern on a magnetic tape even in the case where the transfer rate varies.

(4) Other Embodiments

In the above embodiment, the first clock signal CK2 is multiplexed by 1/1, 1/2, and 1/4, and a single second switching unit 6, a single third switching unit 25, a single second variable current source 10 and a single third variable current source 26 are provided for highlighting operation of the high-frequency component and for band limitation. However, the present invention is not limited thereto and the first clock signal CK2 can be multiplied by the various stated numeric that is not less than 1/3, in accordance with the transfer rate, and plural switching units and plural variable current sources can be provided respectively for use in high-frequency component highlighting and for use in band limitation. In this way, it is able to highlight and limit the high-frequency component and the band, more finely and precisely than the above-mentioned embodiment.

FIG. 8 and FIGS. 9A to 9H, in which the same reference numerals are applied to parts corresponding to FIG. 3, show a recording amplifier 40 of a data recorder according to another embodiment; it is constituted like the recording amplifier 21 of the data recorder 20 according to the above-mentioned embodiment, except that a clock multiplier 41 for multiplexing the period T of the first clock signal CK2 (FIG. 9A) by 1/8 in accordance with the transfer rate, a waveform equalization information generating circuit 42 for generating the first, the second and the third timing-signals $HS_0$, $HS_1$ and $HS_2$, a fourth switching unit 43, and a fourth variable current source 44 are provided.

In this case, on the basis of the second clock signal CKn (FIG. 9B) whose period is obtained by multiplying the period T of the first clock signal CK2 by 1/8, the waveform equalization information generating circuit 42 first detects the time at which the record data D2 (FIG. 9C) rises to logical level [1] and the time at which it falls to logical level [0], and then, on the basis of this result of the detection, generates the first timing-signal $HS_0$ (FIG. 9D) that is synchronized with the second clock signal CKn; the first timing-signal $HS_0$ indicates the highlighting position of the high-frequency component of the edge portion corresponding to the transfer rate, by rising to logical level [1] for three periods of the second clock signal CKn, from the time that has been delayed for two periods of the second clock signal CKn from the time at which the record data D2 rises to logical level [1] and the time at which it falls to logical level [0].

Besides, the waveform equalization information generating circuit 42 generates the second timing-signal $HS_1$ (FIG. 9E) for performing the first band limitation corresponding to the transfer rate, by falling to logical level [0] for one period of the second clock signal CKn preceding and succeeding the time at which the record data D2 rises to logical level [1] and also the time at which it falls to logical level [0], and rising to logical level [1] for the other duration; in addition, the waveform equalization information generating circuit 42 generates the third timing-signal $HS_2$ (FIG. 9F) for performing the second band limitation corresponding to the transfer rate, by falling to logical level [0] for three periods of the second clock signal CKn preceding and succeeding the time at which the record data D2 rises to logical level [1] and also the time at which it falls to logical level [0], and rising to logical level [1] for the other duration.

Then, the waveform equalization information generating circuit 42 sends these the first to the third timing-signals $HS_0$, $HS_1$ and $HS_2$ to the corresponding the second to the fourth switching units 6, 25 and 43, and makes them perform switching operations. By this, in the primary side of the transducer 7, the recording original current (FIG. 9G) is generated by adding the second current $I_{E0}$ to the highlighting position of the high-frequency component of the first current $I_0-I_{E1}-I_{E2}$ and by adding the third current $I_{E1}$ or the fourth current $I_{E2}$ that is generated from the fourth variable current source 44 to the first band position or the second band position of the first current $I_0-I_{E1}-I_{E2}$ respectively; then, by the transducer 7, this is converted into the recording current (FIG. 9H) whose high-frequency component of the edge portion is highlighted in accordance with the transfer rate and also whose band is limited through the separated two stages.

By this, in the recording amplifier 40, it is able to limit the band more finely and more precisely than the data recorder 20 of the above-mentioned embodiment, in this way, it is able to equalize magnetization patterns more precisely even if the transfer rate varies.

Besides, in the above embodiment, the present invention is applied to the data recorder 20 of the helical scanning system that uses a rotational head. However, the present invention is not limited thereto and can be applied to the other various data recording apparatuses that can record the stated data at some changed transfer rates, such as a data recorder of the fixed head type, and a data recording apparatus that can record video data and/or audio data on the various kinds of recording medium such as a magnetic tape and a magnetic disk.

Moreover, in the above embodiment, the digital data D1 is inputted to the signal processing circuit 2 from the exterior. However, the present invention is not limited to this case. Such a system can be used that a record signal of analog is inputted to a signal processing circuit, and analog-to-digital conversion of this record signal is performed in this signal processing circuit, and then recording signal processing of it is performed.

Moreover, in the above embodiment, the clock multiplier 23 is employed as the clock signal generating means that is supplied with the first clock signal corresponding to the record data, for multiplying the period of the supplied first clock signal by the previously set stated numeric in accordance with the transfer rate, and for thereby generating the second clock signal. However, the present invention is not limited to this case. The other various clock signal generating means can be employed, if the period of the first clock signal can be multiplexed with the stated numeric corresponding to the transfer rate.

Moreover, in the above embodiment, the control circuit 24, the first, the second and the third switching units 5, 6 and 25, the first, the second and the third variable current sources 9, 10 and 26, and the transducer 7 are employed, as the recording current generating means for generating the recording current that is corresponding to the record data and that is produced by highlighting the high-frequency component in response to the transfer rate and by limiting the band in response to the transfer rate, on the basis of the supplied record data and the second clock signal given from the clock signal generating means. However, the present invention is not limited to this case. Even if the transfer rate varies, recording current generating means having the other various configurations can be employed, so long as they can generate the recording current that is formed by highlighting the high-frequency component in accordance with the transfer rate and by limiting the band.

Moreover, in the above embodiment, the rotary transformer 13 and the recording head 14 are employed as the recording means for recording the record data on the recording medium on the basis of the recording current given from the recording current generating means, however, the present invention is not limited to this case, and the other various recording means can be employed.

Moreover, in the above embodiment, the waveform equalization information generating circuit 22 and the control circuit 24 are as the timing signal forming means for forming at least one species of first timing-signal that shows the highlighting position of the high-frequency component corresponding to the transfer rate, and for generating at least one species of second timing-signal for performing band limitation corresponding to the transfer rate, on the basis of the record data and the second clock signal. However, the present invention is not limited to this case and timing signal forming means having the other various configurations can be employed.

Moreover, in the above embodiment, the first variable current source 9 and the control circuit 24 are employed as the first current-generating means for generating the first current that is an origin of the recording current corresponding to the transfer rate. However, the present invention is not limited to this case and first current-generating means having the other various configurations can be employed.

Moreover, in the above embodiment, the control circuit 24, the second switching unit 6, the second variable current source 10 and the first switching unit 5 are employed as at least one second current-generating means that is provided in accordance with the species of the first timing-signal which is generated by the timing-signal forming means, for forming the second current that represents the highlighting quantity of the high-frequency component corresponding to the transfer rate, on the basis of the corresponding first timing-signal that is obtained from the timing-signal forming means. However, the present invention is not limited to this case and second current-generating means having the other various configurations can be employed.

Moreover, in the above embodiment, the control circuit 24, the third switching unit 25, the third variable current source 26 and the first switching unit 5 are employed as at least one third current-generating means that is provided in accordance with the species of the second timing-signal which is generated by the timing-signal forming means, for forming the third current for limiting the band corresponding to the transfer rate, on the basis of the corresponding second timing-signal that is obtained from the timing-signal forming means. However, the present invention is not limited to this case and third current-generating means having the other various configurations can be employed.

Moreover, in the above embodiment, the transducer 7 is employed as the current generating means for generating the recording current, on the basis of the first, the second and the third currents obtained from the first, the second and the third current-generating means. However, the present invention is not limited to this case and current generating means having the other various configurations can be employed.

As described above, the present invention provides a clock signal generating means for being supplied with a first clock signal corresponding to the record data and generating a second clock signal by multiplying the period of the supplied first clock signal by the stated numeric corresponding to the transfer rate, a timing signal forming means for forming at least one species of first timing-signal that shows the highlighting position of the high-frequency component of the record data corresponding to the transfer rate and at least one species of second timing-signal which shows a position at which band limitation of the record data is performed according to the transfer rate, on the basis of the record data and the second clock signal, a recording current generating means for highlighting the high-frequency component and generating recording current corresponding to the record data, which has been subjected to the band limitation, on the basis of the record data, the first timing-signal and the second timing-signal, and a recording means for recording the record data on the recording medium in accordance with the recording current. Therefore, it is able to equalize highlighting operation of the high-frequency component with respect to the recording current even in the case where the transfer rate varies, and to equalize band limitation, so as to keep the frequency characteristics approximately constant. In this way, it is able to realize a data recording apparatus that can form nearly identical magnetization pattern on a magnetic tape in even the case where the transfer rate is varied.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A data recording apparatus for recording record data that is supplied at an arbitrary transfer rate on a recording medium, comprising:

clock signal generating means for being supplied with a first clock signal corresponding to said record data and generating a second clock signal by multiplying the period of said supplied first clock signal by the stated numeric corresponding to said transfer rate;

timing signal forming means for forming at least one species of first timing-signal that shows the highlighting position of the high-frequency component of said record data corresponding to the transfer rate and at least one species of second timing-signal which shows a position at which band limitation of said record data is performed according to said transfer rate, on the basis of said record data and said second clock signal;

recording current generating means for highlighting said high-frequency component and generating recording current corresponding to said record data, which has been subjected to said band limitation, on the basis of said record data, said first timing-signal and said second timing-signal; and recording means for recording said record data on said recording medium in accordance with said recording current.

2. The data recording apparatus according to claim 1, wherein said recording current generating means comprises:

first current generating means for generating first current that is an origin of said recording current;

second current generating means for generating current that corresponds to the highlighting quantity of said high-frequency component;

third current generating mans for generating current that corresponds to limitation quantity of said band limitation; and switching means for synthesizing currents generated by said first current generating means, said second current generating means and said third current generating means, wherein said switching means is switching-controlled in accordance with said record data, said first timing-signal and said second timing-signal, and by the switching control, said recording current generating means highlights said high-frequency component and generates recording current that corresponds to said record data subjected to said band limitation.

3. The data recording apparatus according to claim 2, wherein:

said recording current generating means further comprises a transducer comprising two coils which are provided via an intermediate tap on the primary side; and said switching means comprises at least three of first, second, and third switches, wherein:

said first switch of said switching means is a switch for selecting one out of two inputs in accordance with the polarity of said record data for outputting, one input of said first switch is connected to one coil on said primary side of said transducer, the other input of said first switch is connected to the other coil on said primary side of said transducer, and the output of said first switch is connected to said first current generating means, the input of said second switch, and the input of said third switch;

said second switch of said switching means is controlled by said first timing-signal and its output is connected to said second current generating means;

said third switch of said switching means is controlled by said third timing-signal and its output is connected to said third current generating means; and the secondary coil of said transducer reverses the flowing direction in accordance with the polarity of said record data and highlights said high-frequency component by said first timing-signal, and outputs the recording current, which has been subjected to said band limitation, by said second timing-signal.

4. The data recording apparatus according to claim 3, wherein each of said first current generating means, said second current generating means, and said third current generating means is composed of a variable current source, wherein each current source outputs current determined according to said transfer rate.

5. The data recording apparatus according to claim 3, wherein said timing signal forming means forms said first timing-signal in which the phase of the highlighting position of said high-frequency component has been varied in accordance with said transfer rate.

6. The data recording apparatus according to claim 3, wherein said timing signal forming means, wherein:
when said transfer rate is the stated value or more, at least one species of said second timing-signal is formed for performing said band limitation on said recording current having longer signal wavelength than the predetermined value; and when said transfer rate is the stated value or less, at least one species of said second timing-signal is formed for performing said band limitation on said recording current of all wavelengths.

7. The data recording apparatus according to claim 1, wherein said clock signal generating means multiplies said period of said first clock signal by said stated numeric set such that its value is small as said transfer rate is high.

* * * * *